US012567833B2

(12) United States Patent
Nishimura et al.

(10) Patent No.: US 12,567,833 B2
(45) Date of Patent: Mar. 3, 2026

(54) CABLE UNIT

(71) Applicants: MERSINTEL, K.K., Kyoto (JP); CEF CO., LTD., Nemuro (JP)

(72) Inventors: Hiroyuki Nishimura, Kyoto (JP); Toshihiro Yamamoto, Kyoto (JP)

(73) Assignees: MERSINTEL, K.K., Kyoto (JP); CEF CO., LTD., Nemuro (JP)

( * ) Notice: Subject to any disclaimer, the term of this patent is extended or adjusted under 35 U.S.C. 154(b) by 0 days.

(21) Appl. No.: 18/695,672

(22) PCT Filed: Jun. 13, 2023

(86) PCT No.: PCT/JP2023/021970
§ 371 (c)(1),
(2) Date: Mar. 26, 2024

(87) PCT Pub. No.: WO2023/243640
PCT Pub. Date: Dec. 21, 2023

(65) Prior Publication Data
US 2024/0396496 A1 Nov. 28, 2024

(30) Foreign Application Priority Data
Jun. 14, 2022 (JP) ................................. 2022-095607

(51) Int. Cl.
*H02S 40/36* (2014.01)
*H01R 13/207* (2006.01)
(Continued)

(52) U.S. Cl.
CPC ........... *H02S 40/36* (2014.12); *H01R 13/207* (2013.01); *H01R 13/642* (2013.01); *H02S 40/34* (2014.12)

(58) Field of Classification Search
CPC ........... H02S 40/30; H02S 40/34; H02S 40/36
See application file for complete search history.

(56) References Cited

U.S. PATENT DOCUMENTS

2010/0258157 A1 10/2010 Arai
2012/0315783 A1 12/2012 Wiest et al.
(Continued)

FOREIGN PATENT DOCUMENTS

JP 2004-349507 A 12/2004
JP 2005-224036 A 8/2005
(Continued)

OTHER PUBLICATIONS

PCT/ISA/210, "International Search Report for PCT International Application No. PCT/JP2023/021970," Aug. 29, 2023.

*Primary Examiner* — Daniel P Malley, Jr.
(74) *Attorney, Agent, or Firm* — HAUPTMAN HAM, LLP

(57) ABSTRACT

There is provided a cable unit for connecting PV panels that can electrically connect a large number of PV panels to one another safely and quickly without concerns about connection errors and is easy to handle during conveyance and construction. A standardized cable unit is used including a first connector at one end of a pair cable composed of two cables that are negative and positive, and a second connector at the other end. Conductive coupling bolts are passed through coupling bolt holes provided at respective negative electrodes and positive electrodes of the first connector and the second connector, and output terminals of junction boxes of PV panels adjacent to each other are connected with the cable unit, whereby electrical continuity between the output terminals is established.

5 Claims, 11 Drawing Sheets

(51) Int. Cl.
　　H01R 13/642　　　(2006.01)
　　H02S 40/34　　　　(2014.01)

(56)　　　　　　References Cited

U.S. PATENT DOCUMENTS

| | | | |
|---|---|---|---|
| 2012/0315787 A1* | 12/2012 | Wiest | H02S 40/34 |
| | | | 439/502 |
| 2015/0249426 A1 | 9/2015 | Okawa et al. | |
| 2017/0366136 A1 | 12/2017 | Feldmann et al. | |
| 2022/0376654 A1 | 11/2022 | Kamata | |

FOREIGN PATENT DOCUMENTS

| | | | |
|---|---|---|---|
| JP | 2010-250989 A | 11/2010 |
| JP | 2017-511096 A | 4/2017 |
| JP | 2019-518404 A | 6/2019 |
| WO | 2021/054306 A1 | 3/2021 |

* cited by examiner (b)

CABLE UNIT

RELATED APPLICATIONS

The present application is National Phase of International Application No. PCT/JP2023/021970 filed Jun. 13, 2023, and claims priority from Japanese Application No. 2022-095607, filed Jun. 14, 2022, the disclosure of which is hereby incorporated by reference herein in its entirety.

TECHNICAL FIELD

The present invention relates to a connection component technology in an electric power facility, and particularly relates to a cable unit for making electrical interconnection among PV panels composing a solar module.

BACKGROUND ART

Photovoltaic power generation (also referred to as solar power generation) has been put into practical use as means of securing energy to realize a low-carbon society. Solar power generation is such that one or more solar panels (Photo-Voltaic Panel: PV panel) are arranged to obtain predetermined electric power.

Solar power generation facilities are widely used in small-scale facilities for homes to large-scale facilities that replace existing power generation facilities of thermal power, nuclear power and the like. In particular, a large-scale solar power generation facility included in the concept of a power plant (power station) is also called a mega solar (mega solar power generation site).

In a mega solar, a large number of modules composed of thousands or tens of thousands of PV panels are placed on the ground or on the water, and the solar energy is converted into electric power energy and transmitted to consumers.

FIG. 9 is an explanatory view of a parallel connection method of PV panels that is employed by the present invention. Further, FIG. 10 is an explanatory view of a series connection method of PV panels that has been widely employed conventionally. In a solar power generation facility, a plurality of PV panels are arranged in a power generation site as one module (solar module). One module connects power generation outputs of 10 or 20 PV panels 6 to obtain a necessary voltage. In FIG. 9 and FIG. 10, power generation voltage of one PV panel is, for example, 40 V, and 20 PV panels 6 compose one module 60. Suh a solar module may also be referred to as a string.

Note that the PV panel 6 is equipped with a junction box 5 for taking out generated power to outside. Usually, the junction box 5 contains an optimizer (OP) having MTTP (Maximum Power Point Tracking: maximum power point tracking control) function, and electrically connects a DC output thereof to junction boxes of adjacent PV panels.

When the power generation voltage of the one PV panel is, for example, 40 V (DC), the optimizer raises the power generation voltage to, for example, 800 V in a booster circuit. In the parallel connection method of PV panels, the 800 V output of the junction box 5 of each of the PV panels is connected to a parallel connection line 21. Accordingly, a voltage output of the solar module 60 is 800 V. The output is adjusted to a necessary voltage (AC 100V or the like) in a power conditioner (commonly known as power conditioner: Power Conditioning System: PCS) 22 shown in FIG. 11, and is supplied to loads or systems of consumers.

In the series connection method in FIG. 10, a voltage output of, for example, 800 V is obtained by 20 sheets of PV panels 6 each with, for example, 40 V (DC) output connected in series by a series connection line 23 in the junction boxes 50 of the respective PV panels 6. The module output is connected to a power conditioner not illustrated. The power conditioner in this case may include an MPPT function.

FIG. 11 is an explanatory view of a module configuration example for dense array of PV panels proposed by the inventors of the present application. In this configuration example, a module 60-1 composed of only one PV panel 6, a module 60-n where n PV panels 6 that are two or more PV panels 6 are connected in parallel, and a standard module 60-s composed of standard PV panels (10 PV panels in the drawing) are used. Note that s>n>2 is satisfied usually. The standard module 60-s is used and placed in a main region in a planar shape of a power generation site (location), and the module 60-1 and the module 60-n are used for placement in irregular portions such as outer edges of the location and arranged. This enables effective use of the location surface. The standard module 60-s, the module 60-1, and the module 60-n are connected by the parallel connection line 21.

FIG. 12 is an explanatory view of a case where generated power of one PV panel 6X+1 is equal to or less than a predetermined value or a case where the one PV panel 6X+1 fails (malfunctioning or the like), when a plurality of PV panels composing a module are connected in parallel. The same applies to a case where a plurality of PV panels are malfunctioning.

In the case of the series connection method described in FIG. 10, if a malfunction occurs in only a single PV panel, the generated power of all the PV panels composing the module is automatically disconnected from the power generation system. In other words, power supply to the power conditioner 22 is disabled.

In the case of the parallel connection method, as shown in FIG. 12, only the PV panel 6X+1 where a malfunction occurs is disconnected from the module (bypassed), and the generated power of the remaining normal PV panels 6X, and 6X+2 to 6X+n composing the module is supplied to the power conditioner 22 and effectively used. At this time, a backflow prevention measure (insertion of a diode circuit or the like) is usually applied so that a current does not flow into the malfunctioning panel from the parallel connection line.

FIG. 13 is a schematic view explaining an example of parallel connection of the PV panels composing the module. A PV panel 6n on a left side of a paper surface in the drawing and an adjacent panel 6n+1 on the right are connected by the parallel connection line 21. PV panel terminals 51 are present on rear surfaces of the respective PV panels. The PV panel terminals 51 are connected to the parallel connection line 21 via the respective junction boxes 5. In the present invention described below, the optimizer is contained in the junction box.

In FIG. 13, the output terminal 51 of the PV panel and the junction box 5, and the junction box 5 and the parallel connection line 21 are connected by individual connectors 52 independent for each polarity. Connection of a plurality of lines by the conventional individual connectors 52 like this requires time for connection work, and may bring about a connection error. Therefore, the completion inspection after work requires many people and much time, which is one of bottlenecks in reducing construction cost and is the problem to be solved.

In view of existence of the problem as above, as electrical connection means of the PV panels, there has been conventionally known a connector assembly as shown in Patent Literature 1, for example. The electrical connection means disclosed in Patent Literature 1 is as follows.

That is, a pair of connector ports (receiving side and giving side) are provided at mutually adjacent corner portions of each PV panel, and a cable having connectors at both ends is prepared. For example, a connector at the end portion of the cable extending from an upstream side (adjacent one) PV panel side is plugged into a receiving side connector port at a downstream side (next adjacent PV panel), and a connector at an end portion of a cable extending to the next PV panel is plugged into the giving side connector port. This is repeated in order, to electrically connect the plurality of PV panels.

Further, Patent Literature 2 discloses a structure that electrically connects a plurality of PV panels with a structure in which a cable with one end fixed to a junction box and a male connector attached to the other end is connected to a female connector of a junction box of an adjacent PV panel.

CITATION LIST

Patent Literature

Patent Literature 1: Japanese Translation of PCT International Application Publication No. 2019-518404
Patent Literature 2: Japanese Translation of PCT International Application Publication No. 2017-511096

SUMMARY OF INVENTION

Technical Problem

In solar power generation facilities, a large number of modules in which a plurality of PV panels are arranged are typically laid. In particular, in a mega solar, in addition to connections between thousands or tens of thousands of PV panels, there is a need to interconnect the modules composed of the PV panels. Connecting such a large number of PV panels and connecting the power generation outputs of a large number of modules in parallel efficiently without a connection error are extremely troublesome and difficult with the aforementioned conventional connectors and cables, and it is difficult to eliminate occurrence of a connection error.

In the connection method disclosed in Patent Literature 1, the connector ports on the receiving side and the giving side are parallel, and therefore a confirmation work is required to cause the cable connector from the upstream side and the connector at the downstream side to correspond to each other without fail. In the connection method disclosed in Patent Literature 2, since the one end of the cable is fixed to the junction box in advance, the cables go around the PV panels, and additional consideration is required in conveyance and handling during packaging and construction.

In the PV panels, electric power is constantly generated in the environments where they are exposed to light energy. It is not common to shield PV panels and modules from sunlight during installation work. In particular, each of the PV panels dealt in the present invention has an optimizer circuit in (the junction box of) the PV panel itself, and the output voltage thereof is, for example, a high voltage around 800 V. Since the task of electrically connecting them in parallel needs to be done extremely carefully because of the risk.

It is an object of the present invention to provide a cable unit for parallel interconnection between PV panels or the like that solves the above-described conventional problem, can electrically interconnecting a large number of PV panels or the like safely, and quickly without a connection error, and is easily handled during transportation and construction.

Note that, here, electrical connection between a plurality of EV panels in a module is described as an example, but the cable unit according to the present invention is also similarly applicable as means for connecting solar modules in parallel or means for connecting the plurality of modules connected in parallel to a power conditioner. In that case, effective and quick electrical connection is possible by giving some additional structure such as bifurcating the connector.

It is also possible to connect the solar modules and power conditioner by applying the structure of the cable unit of the present invention to the output of each of the solar modules and the parallel input terminal of the transmission cable to the power conditioner.

Solution to Problem

In order to attain the above-described object, a cable unit according to the present invention includes connectors in special combination shapes such as complimentary concavity and convexity at both ends of a pair cable composed of two cables that are for a positive electrode, that is, plus (+) and for a negative electrode, that is, minus (−), and uses a standardized cable having a length dimension for electrically coupling (bridging in a situation of bypassing a malfunctioning panel) output terminals of respective junction boxes included in PV panels adjacent to each other.

In the following description, in order to facilitate understanding of the configuration of the present invention, components of the invention are assigned with the corresponding reference signs in the example.

A cable unit 10 according to the present invention has a connector ("A" connector) at one end and a connector ("B" connector) at the other end provided on the other side that are electrically connected to sockets (power generation output terminals) 14 for output (a negative socket 14a, a positive socket 14b) provided at a junction box 5 of a PV panel 6 with conductive bolts 7 (7a, 7b).

A typical configuration of the cable unit 10 according to the present invention is described in an easy-to-understand manner as follows, In other words, the cable unit 10 according to the present invention is composed of a pair cable 20 composed of a positive cable 3 and a negative cable 4, and a first connector 1 ("A" connector) attached to one end of the pair cable 20 and a second connector 2 ("B" connector) attached to the other end.

The "A" connector 1 which is the first connector is a connector to be coupled to the socket 14 of the junction box 5 provided on a PV panel for which connection work is performed, and is the connector that is attached to one end of a cable unit extending from a panel adjacent to the panel for which the connection work is performed.

The "B" connector 2 which is the second connector is the connector that is superposed on the "A" connector 1 which is the above-described first connector (combined into the above-described complementary concave and convex shapes from an opposite side to the junction box) and conductively connected and fixed by bolts and nuts or screws.

Even in a state where the conductive bolts 7 (7a, 7b) are released from screwing into the sockets 14 of the junction box 5, electrical connections of the respective electrodes of the first connector and the second connector are maintained by a bolt 7c.

As described above, the cable unit 10 according to the present invention is connection means for connecting DC output terminals (power generation output terminals) included in the PV panel composing the solar module 60 in parallel. The junction box included in the PV panel to which the present invention is applied has an optimizer circuit. The power generation output terminals described above has an output voltage of 800 V, for example, obtained by raising the output (40 V, for example) of the PV panel by the optimizer circuit.

The above-described cable unit 10 is composed of the pair cable 20 composed of the positive cable 3 and the negative cable 4, and the first connector 1 ("A" connector) attached to one end of the pair cable 20 and the second connector 2 ("B" connector) attached to the other end. These connectors are formed of a material having a long life and weather resistance with a suitable insulation property such as a synthetic resin such as an ABS resin, a hard rubber material such as a hard silicon rubber, or ceramics.

The first connector 1 has plugs 12 (a negative plug 12a, a positive plug 12b) for being joined to DC output terminals of the PV panel 6. Further, sockets 8 (a negative socket 8a, a positive socket 8b) are provided on a surface facing the second connector 2, of the first connector 1.

Plugs 120 (a negative plug 120a, a positive plug 120b) respectively joined to the sockets 8 (the negative socket 8a, the positive socket 8b) of the first connector 1 are provided on a surface facing the first connector 1, of the second connector 2.

Sockets 80 (a negative socket 80a, a positive socket 80b) are provided on a surface on an opposite side to the negative plug 120a and the positive plug 120b of the second connector 2.

The sockets 14 (the negative socket 14a, the positive socket 14b) of the junction box terminals that are the DC output terminals of the PV panel 6, the plugs 12 (the negative plug 12a, the positive plug 12b) of the first connector 1, the sockets 8 (the negative socket 8a, the positive socket 8b) of the first connector 1, and the plugs 120 (the negative plug 120a, the positive plug 120b) of the second connector 2 are formed to be combined in such a manner that they are aligned on the respective straight lines according to negative polarity and positive polarity and conductively connected.

The above-described conductive connection is configured to pass through the sockets 80 (the negative socket 80a, the positive socket 80b) of the second connector 2, and the sockets 8 (the negative socket 8a, the positive socket 8b) and the plugs 12 (the negative plug 12a, the positive plug 12b) of the first connector 1 to reach the sockets 14 (the negative socket 14a, the positive socket 14b) of the junction box 5.

The above-described conductive connection uses the conductive coupling bolts 7 (the negative conductive coupling bolt 7a, the positive conductive coupling bolt 7b) that are respectively inserted through the respective negative sockets and plugs, and the respective positive sockets and plugs of the second connector 2 and the first connector 1 from sockets 80 (the negative socket 80a, the positive socket 80b) side of the second connector 2 to be fixed by the screw holes or nuts provided in the output sockets 14 (the negative output socket 14a, the positive output socket 14b) of the aforementioned junction box. As described above, even in the state where the conductive bolts 7 (7a, 7b) are released from the engagement by screwing or the like with the output terminal portions 15 of the junction box 5, electrical connection of the first connector 1 and the second connector 2 is maintained. Note that though described later, mechanical coupling of the first connector and the second connector is performed by fixation by the separate screw 7c or bolt.

Each of the plugs 12 (the negative plug 12a, the positive plug 12b) for coupling of the first connector 1 connected to the output terminal portion 15 (the negative output terminal portion 15a, the positive output terminal portion 15b) of the junction box 5 of the PV panel 6 constituting an end portion of the solar module 60 is insulated and sealed, and electrically connected to the aforementioned conductive coupling bolts 7 (the negative conductive coupling bolt 7a, the positive conductive coupling bolt 7b).

On the connectors and plugs that interconnect the first connector ("A" connector) 1, the second connector ("B" connector) 2, and the junction box 5, complimentary concave and convex shapes that align with each other when superposed on each other for prevention of erroneous connection are formed. When a concave of one side does not meet a convex of the other side, connection cannot be made. The concave and convex shapes are formed so that connection cannot be made if the above-described concave and convex positions do not match. By adopting this shape, erroneous connection is avoided. This shape may be rough and is optional in view of the shape of the connector.

In a state where the first connector ("A" connector) 1 and the second connector ("B" connector) 2 are correctly superposed by combining the complimentary concave and convex shapes, the fixing bolt and nut (or screw) 7c is screwed into the coupling bolt holes 80c and 8c and fixed. Even if the aforementioned conductive coupling bolts 7 (7a, 7b) are released from screwing into the output terminal portions 15 (the negative output terminal portion 15a, the positive output terminal portion 15b) of the junction box 5, the first connector ("A" connector) 1 and the second connector ("B" connector) 2 remain to be integrally coupled.

This work is performed for all the PV panels in the module, and thereby the integral module is electrically connected.

The above-described conductive coupling bolts (7a, 7b) have a function of fixing the connector to the junction box 5. In electrical disconnection at the time of malfunction of the PV panel described later, the fixing screw 7c serves as fixing means that holds the first connector ("A" connector) 1 and the second connector ("B" connector) 2 together.

The present invention is not limited to the above-described configuration, and the configuration described in the example described below, but various changes are possible within the scope of the technical idea of the present invention.

Advantageous Effects of Invention

With the configuration of the present invention, a large number of PV panels can be electrically connected in parallel to one another safely and quickly without a connection error. The cable unit according to the preset invention can be reduced in cost by standardizing the length of the pair cable and is easy to handle during conveyance and construction. The cable unit according to the present invention can also be applied to parallel connection between modules, and connection to the power conditioner after connection between modules.

That is to say, by coupling the "A" connector 1 and the "B" connector 2 with the pair cable 20 to create the standardized cable unit 10, parallel connection work of a large number of PV panels becomes extremely easy, and efficient installation work is possible without special education or training. In addition, by adopting the standardized cable unit, construction cost including transportation can be expected to be significantly reduced.

By using this cable unit, the separation work of only the PV panel where a malfunction occurs during operation is easy, and work for reconnecting the PV panel where the malfunction is resolved becomes easy. Note that as described above, the cable unit can also be applied as an inter-module connector that connects a plurality of modules in parallel. Further, it is possible to further enhance working efficiency by making connection between the inter-module connector and the power conditioner in the similar connection structure to the "A" connector 1 and the "B" connector 2.

In order to avoid incorrect work such as errors in connections between sockets and plugs between the "A" connector, the "B" connector, and the junction box, and connections between coupling terminals and the negative pole and the positive pole of the pair cable, concavities and convexities (combination structure including protrusions, notches and the like: complimentary shapes) that gently and sufficiently fit together are formed on the front and back sides of the corresponding sockets and plugs. The shapes of the concavities and convexities (including protrusions, notches and the like) may be relatively optionally formed, and details thereof are not particularly illustrated. A concavity and convexity fitting structure with a known likelihood or the like can be properly adopted.

Further, as a simple method in the case where it is difficult to impart a remarkable shape, appropriate marks or characters are added to the opposite parts (facing contact parts) or the contact surfaces of the corresponding socket and the plug, and a fluorescent paint is further given to them in addition, whereby workability at the time of repair at night can also be improved. This can be used in conjunction with the complementary shapes described above.

DESCRIPTION OF EMBODIMENT

Hereinafter, an embodiment of the present invention will be described in detail with reference to the drawings (FIG. 1(*a*) to FIG. 8) of an example.

Example

Figure 1:
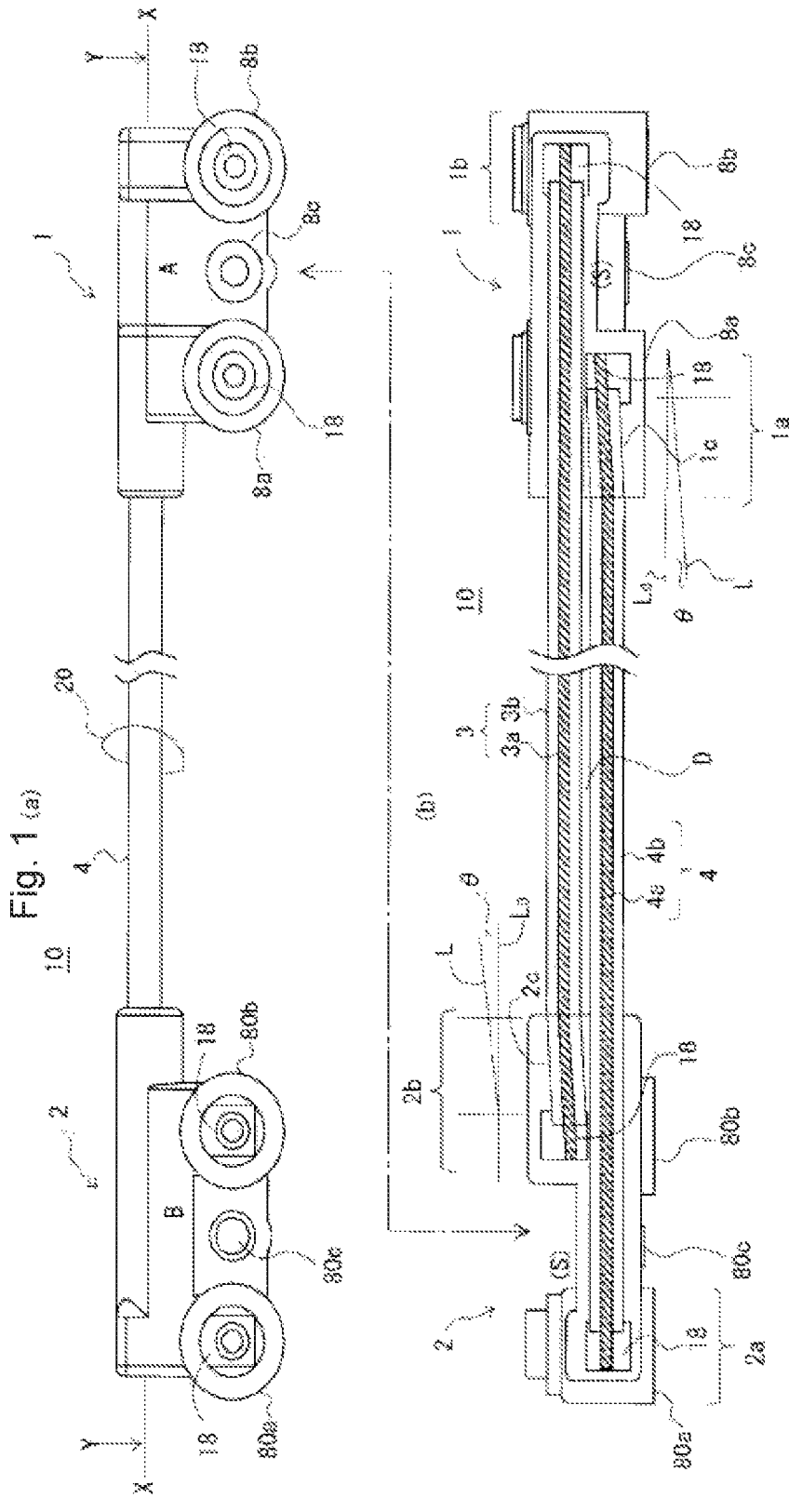
FIGS. 1(*a*) and 1(*b*) are schematic views explaining one example of a cable unit according to the present invention, wherein FIG. 1(*a*) is a front view, and FIG. 1(*b*) is a top view taken along X-X line in FIG. 1(*a*) seen in a Y direction.
Figure 2:
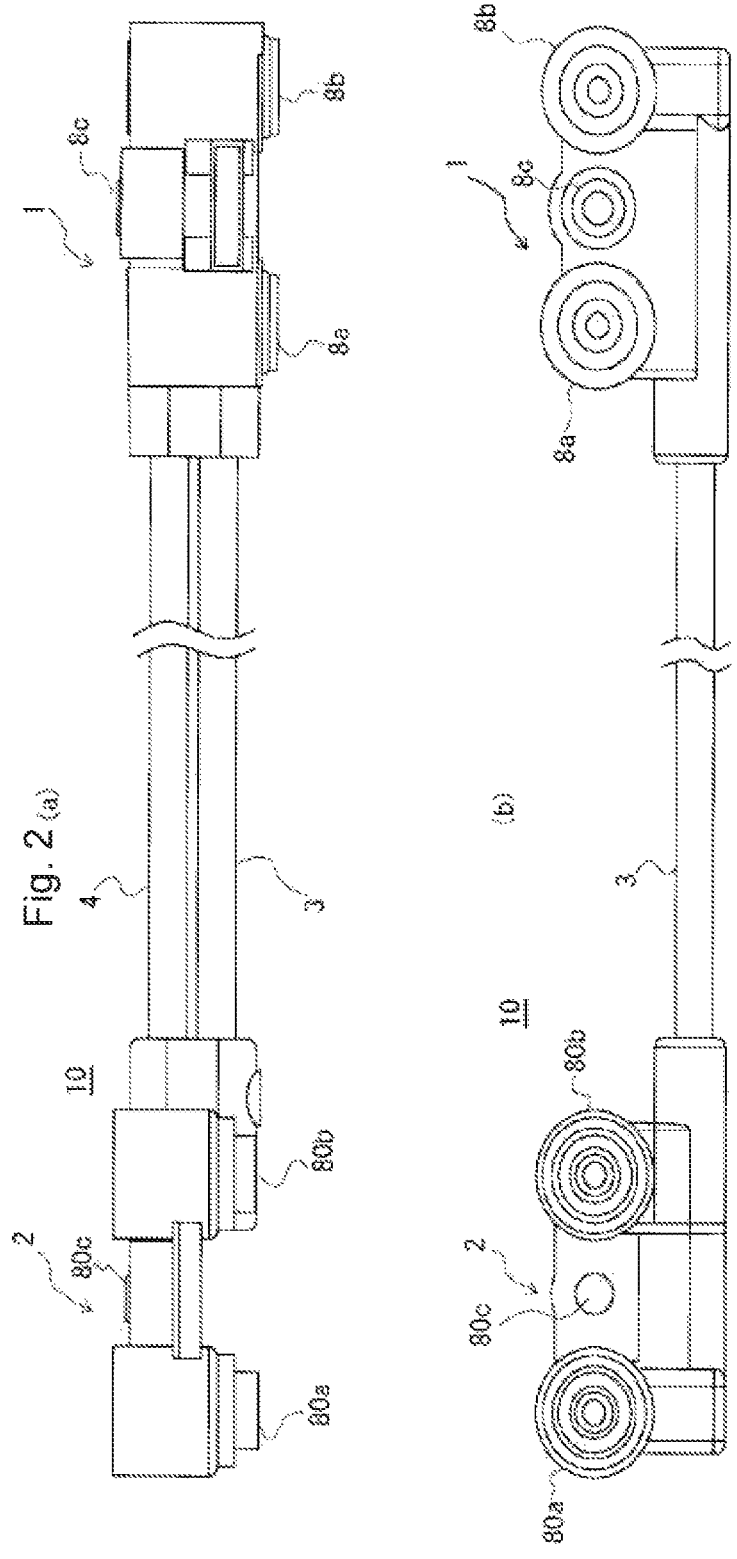
FIGS. 2(*a*) and 2(*b*) are views explaining one example of the cable unit according to the present invention shown in FIGS. 1(*a*) and 1(*b*), wherein FIG. 2(*a*) is a bottom view, and FIG. 2(*b*) is a back view.
Figure 3:
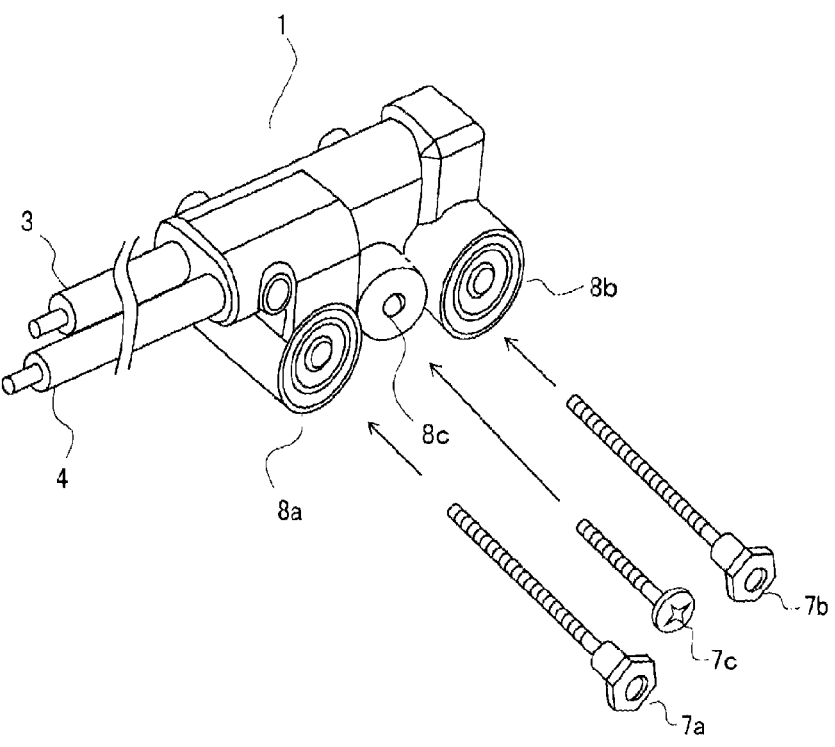
FIG. 3 is a perspective view of an "A" connector portion composing one example of the cable unit according to the present invention shown in FIGS. 1(*a*) and 1(*b*).
Figure 4:
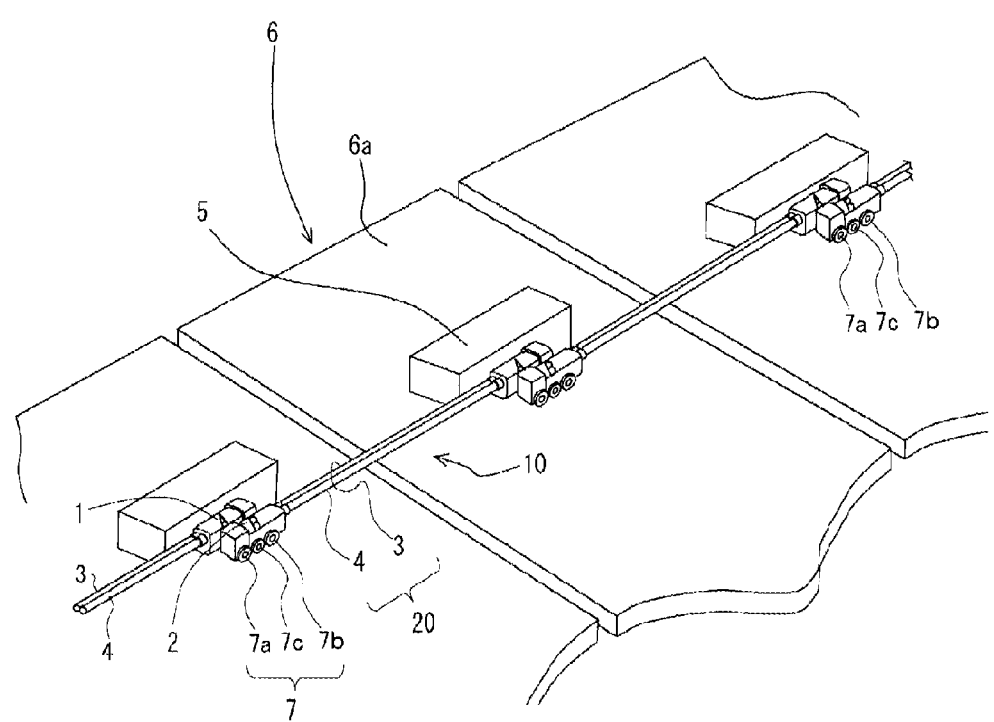
FIG. 4 is an explanatory view of an interconnection state between a plurality of PV panels using the cable unit according to the present invention.
Figure 7:
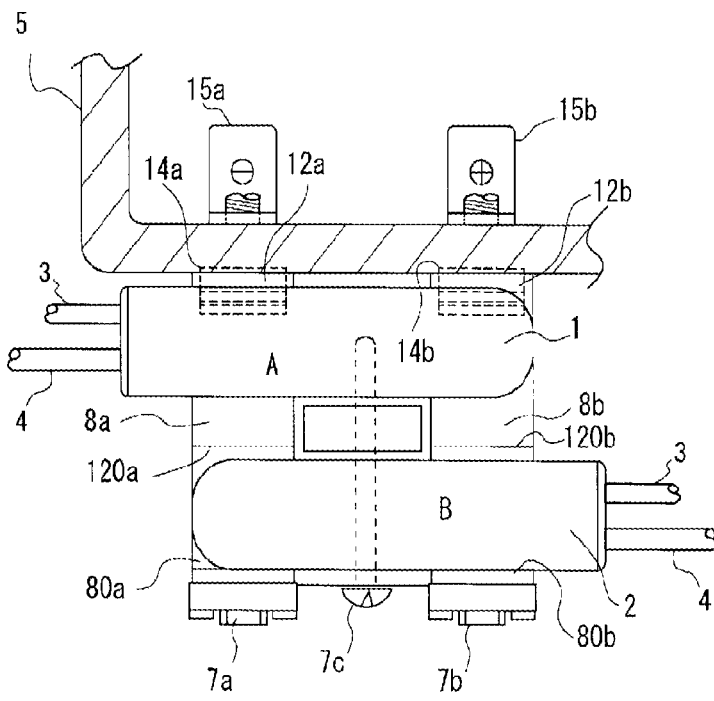
FIG. 7 is a conceptual view explaining one example of a fixed state by the conductive bolts to the "A" connector and the "B" connector of the cable unit according to the present invention and the sockets that are the output terminals of the junction box of the solar module provided at the junction box.

FIGS. 1(*a*) and 1(*b*) are schematic views explaining an entire structure of one example of a cable unit according to the present invention, FIG. 1(*a*) is a front view, and FIG. 1(*b*) is a top view taken along X-X line in FIG. 1(*a*) seen in a Y direction. Further, in FIGS. 2(*a*) and 2(*b*), FIG. 2(*a*) is a bottom view of the cable unit according to the present invention shown in FIGS. 1(*a*) and 1(*b*), and FIG. 2(*b*) is a back view. FIG. 3 is a perspective view of an "A" connector portion composing one example of the cable unit, FIG. 4 is an explanatory view of an interconnection state between a plurality of PV panels using the cable unit, FIGS. 5(*a*), 5(*b*), 6(*a*), 6(*b*), 6(*c*) and FIG. 7 are explanatory views of attaching and fixing states of the connectors and the junction box, and FIG. 8 is a schematic view explaining polarities for interconnecting a plurality of solar panels using the cable unit in parallel.

Figure 9:
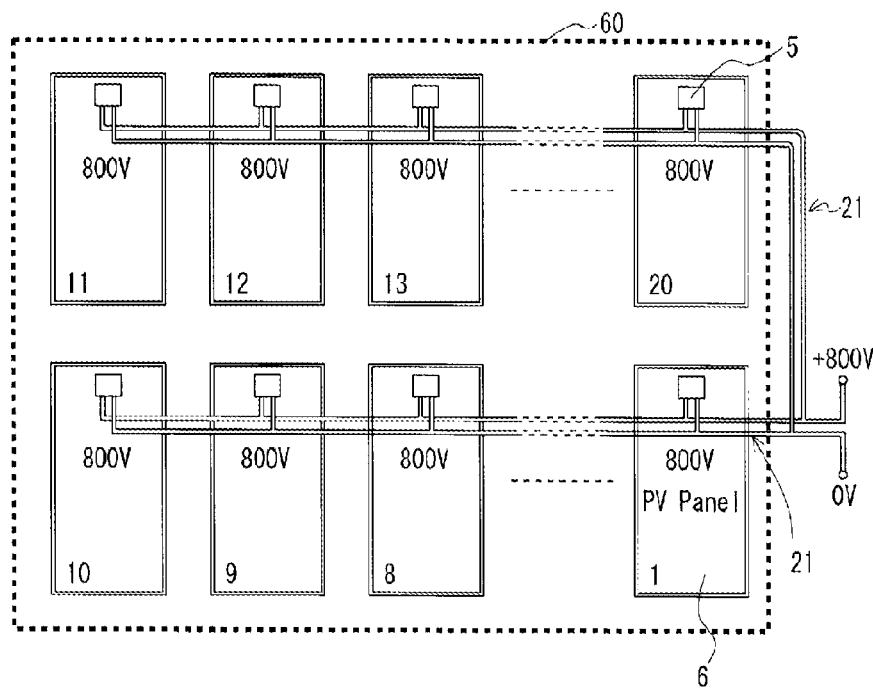
FIG. 9 is an explanatory view of a parallel connection method of PV panels adopting the cable unit according to the present invention.
Figure 10:
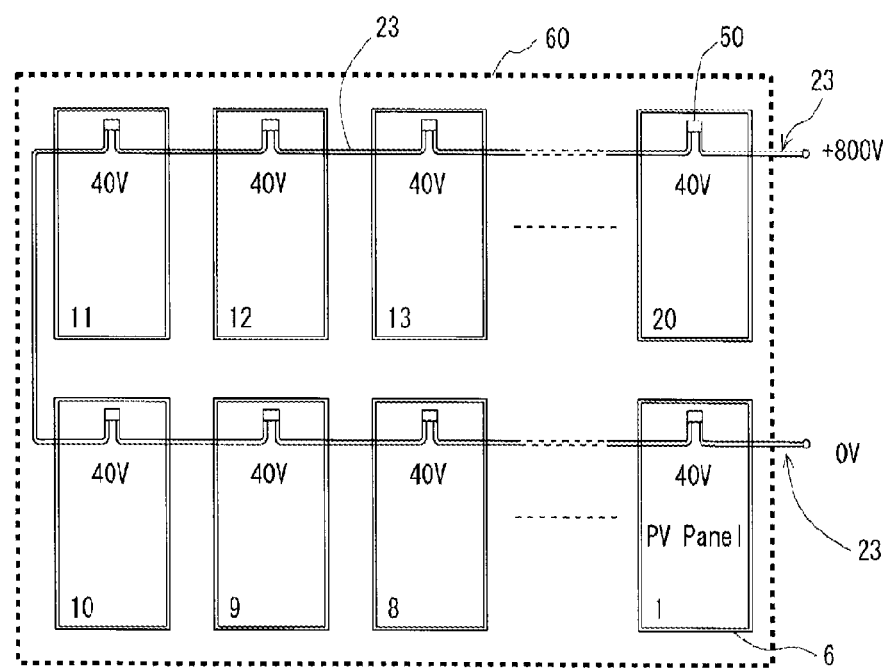
FIG. 10 is an explanatory view of a series connection method of PV panels that has been widely adopted conventionally.

A cable unit 10 is electrical connection means for interconnecting solar modules 60 (see FIG. 9) composed of a large number of PV panels 6 each including a junction box 5 containing an optimizer described later with FIG. 4.

The cable unit 10 is composed of a pair cable 20 composed of a positive cable 3 and a negative cable 4, and a first connector 1 ("A" connector) formed of an insulating material and attached to one end of the pair cable 20 and a second connector 2 ("B" connector) formed of an insulating material and attached to the other end.

The first connector 1 has a conductive socket 8*a* for a negative electrode and a conductive socket 8*b* for a positive electrode each including a terminal plate 18 for conductively connecting to DC output terminals 15 (negative electrode output terminal 15*a*, a positive electrode output terminal 15*b*) of the junction box 5 included in the PV panel 6. Further, conductive plugs 1*a* and 2*a* for a negative electrode and conductive plugs 1*b* and 2*b* for a positive electrode are provided on a surface facing the second connector, of the first connector of another cable unit to be connected. The terminal plate can have a nut function of being screwed onto a bolt 7.

There are included conductive coupling bolts 7*a* and 7*b* that conductively connect the positive connection terminal 15*b* and the negative connection terminal 15*a* of the junction box 5 included in the PV panel 6, the socket 8*a* for a negative electrode and the socket 8*b* for a positive electrode of the first connector 1, the plug 12*a* for a negative electrode and the plug 12*b* for a positive electrode of the first connector 1, and the socket 120*a* for a negative electrode and the socket 120*b* for a positive electrode of the second connector 2 by aligning them on straight lines according to a negative electrode and a positive electrode.

Spaces (S) are included, which are formed by being retreated from each other inward in an extending direction of the pair cable 20 between the plug 1*a* for a negative electrode and the plug 1*b* for a positive electrode of the first connector 1 attached to one end of the pair cable 20 and the second connector 2 attached to the other end of the other pair cable, and coupling bolt holes 8*a*, 80*a*, 8*b* and 80*b* for passing the conductive coupling bolts 7*a* and 7*b* that penetrate through the second connector 2 of the other cable unit and the first connector 1 respectively to connect both of them to the output terminals of the aforementioned junction box (5) are formed in the space between the plug 1*a* for a negative electrode and the plug 1b for a positive electrode.

The fixing bolt 7*c* is shorter than lengths of the conductive coupling bolts 7*a* and 7*b* (not protruding to the junction box 5 side). The fixing bolt 7*c* is to retain a state where the first connector 1 and the second connector 2 are integrally fixed in a state where the conductive coupling bolts 7*a* and 7*b* are retreated by releasing connection to the DC output terminals 15 (the negative output terminal 15*a*, the positive output terminal 15*b*) of the junction box 5 when a malfunction occurs to the PV panel. A thickness thereof is optional.

Center lines L of cable fixing holes 2*c* and 1*c* on one sides that are retreated to connector sides on the other ends with respect to the aforementioned space of the plug 1*a* for a negative electrode and the plug 1*b* for a positive electrode at one ends of the pair cable 20 of the first connector 1 attached to the one end of the pair cable 20 and the second connector 2 attached to the other end each have an inclination outward at an angle θ with respect to an extending direction L₀ of the cable on the other side.

A size of the angle θ is large enough to ensure sufficient insulation properties between the positive cable 3 and the negative cable 4 due to adhesion of dust and water droplets in a space D especially near the connectors, and to ensure a space where a cooling effect by air flow is obtained between both the cables. The size of the angle θ can be determined in consideration of outer shapes of the cables and convenience of attaching workability.

Further, outer surfaces of the sockets of the first connector 1 and the second connector 2 are given complementary concave and convex shapes as illustrated, for example. This can prevent erroneous connection of the junction box 5 and the cable unit 10 during work. The concave and convex shapes are not limited to illustrated shapes if they provide the structure in which the conductive coupling bolts 7*a* and 7*b* reach the junction box in the assembled and superposed state, and the fixing bolt 7*c* fixes the second connector 2 to the first connector 1.

FIG. 3 is a perspective view explaining an arrangement example of the pair cable 20 (3, 4), the sockets 8 (8*a*, 8*b*) of the connector 1, the coupling bolt hole 8*c*, and the conductive coupling bolts 7 (7*a*, 7*b*) and the fixing bolt 7*c* of the cable unit 10. The connector 2 of the other cable unit is joined on a rear surface of the connector 1.

Note that a shape of the connector 2 may be assumed to be a left-right opposite shape with a complementary shape in which the coupling bolt hole 8*c* portion of the connector 1 is removed.

Figure 11:
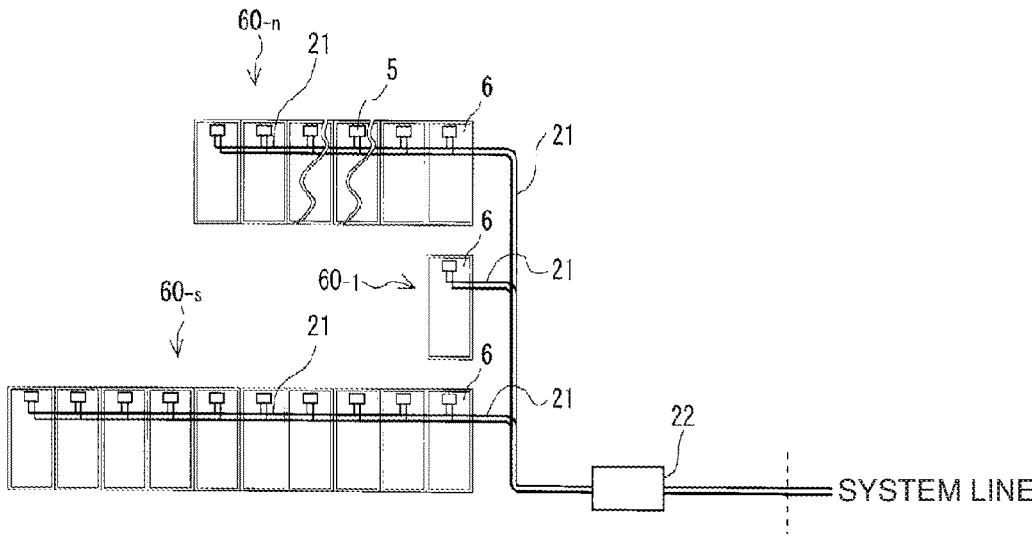
FIG. 11 is an explanatory view of a module configuration example for dense array of PV panels proposed by the inventors of the present application.
Figure 12:
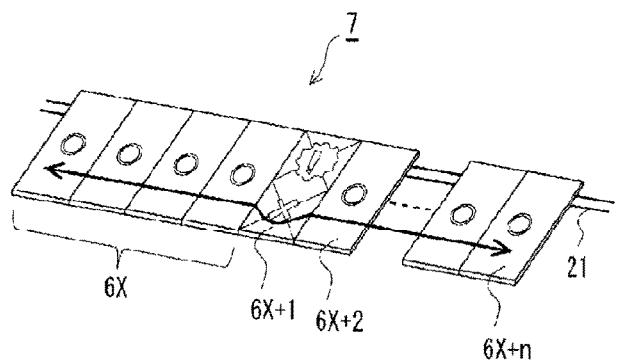
FIG. 12 is an explanatory view of a case where generated power of one PV panel 6X+1 is equal to or less than a predetermined value or the PV panel 6X+1fails when PV panels composing a solar module are connected in parallel.
Figure 13:
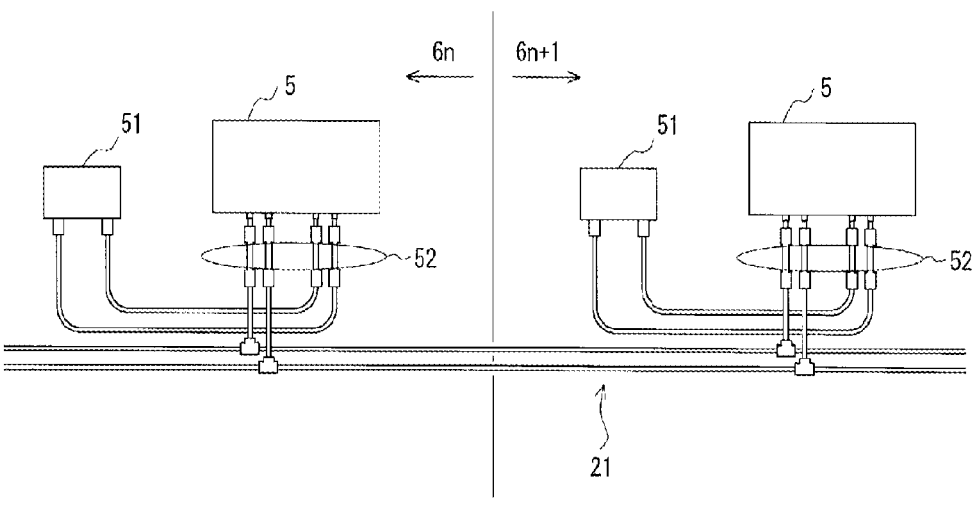
FIG. 13 is a schematic view explaining one example of parallel connection of PV panels composing a module.

As shown in FIG. 4, the plurality of EV panels 6 composing the solar module 60 each include the junction box 5 on a rear surface of a panel body 6*a*. FIG. 4 shows the rear surface (opposite side to a surface receiving sunlight) of the solar module. The optimizer is contained in the junction box 5, and DC power of, for example, 800 V is outputted from the optimizer. The output is connected in parallel to the outputs of other PV panels of the cable unit 10 and is transmitted to the power conditioner 22 shown in FIG. 11 as the output of the solar module 60.

Figure 5:
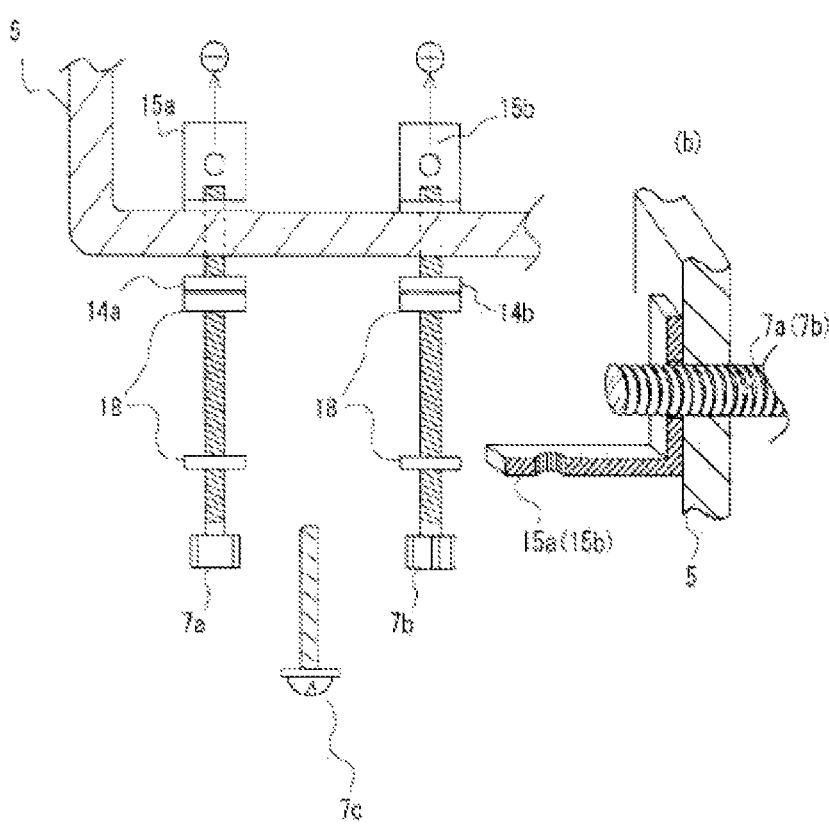
FIGS. 5(*a*) and 5(*b*) are conceptual views explaining an assembled state to sockets as output terminals of a junction box by conductive bolts and a fixing bolt or screws, except for an "A" connector and a "B" connector.

FIGS. 5(*a*), 5(*b*), 6(*a*), 6(*b*), 6(*c*) and FIG. 7 are schematic views explaining a concept of work of attaching and fixing the first connector 1 and the second connector 2 to the junction box 5. FIGS. 5(*a*) and 5(*b*) show an example of means for conductively connecting the cable unit to the junction box 5, and means for fixing. The conductive bolts 7*a* and 7*b* that conductively connect the negative electrode cable 4 and the positive electrode cable 3 to the negative output terminal 15*a* and the positive output terminal 15*b* of the junction box 5 shown in FIG. 5(*a*) are respectively screwed into screw holes of the positive output terminal 15*b* and the negative output terminal 15*a* via sockets 14*b* and 14*a* to be conductively connected and fixed (FIG. 5(*b*)). Nuts may be used in the connection.

Figure 6:
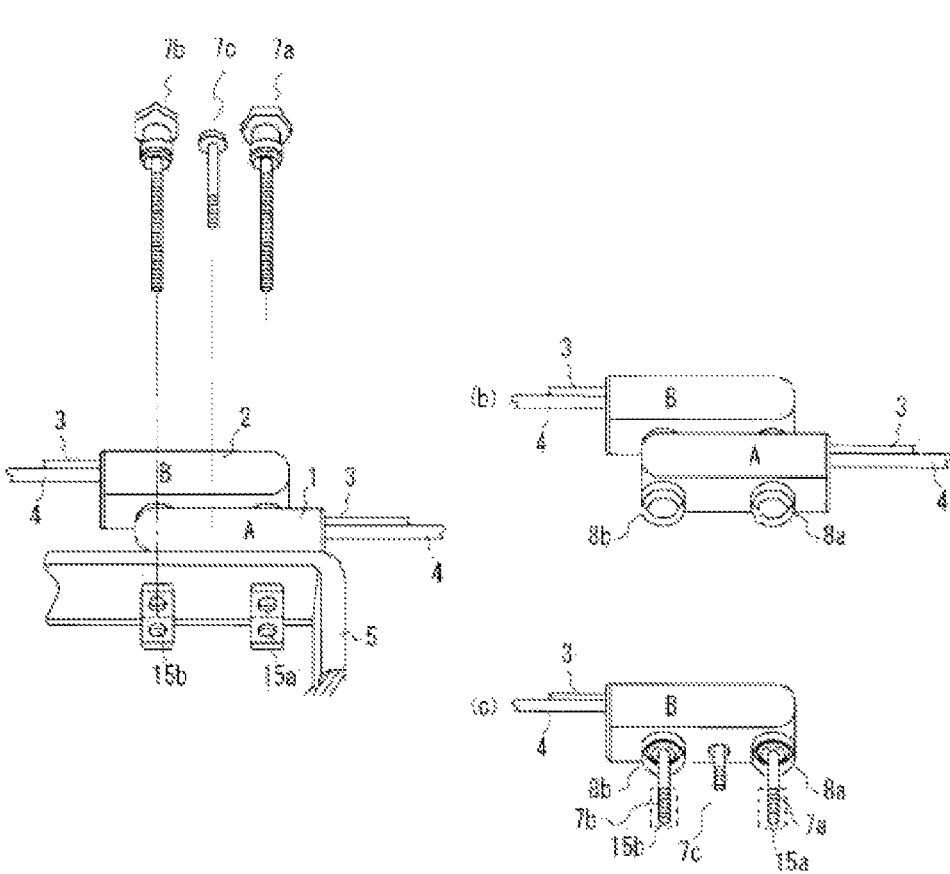
FIGS. 6(*a*) to 6(*c*) are perspective views of a state of attaching and fixing a second connector and a first connector to the junction box explained in FIGS. 5(*a*) and 5(*b*) seen from a junction box side.

FIGS. 6(*a*) to 6(*c*) are perspective views of a state in which the second connector "B"2 and the first connector "A"1 are attached to the junction box and fixed seen from the junction box 5 side, wherein FIG. 6(*a*) shows an entire view, FIGS. 6(*b*) shows a state in which the first connector 1 is assembled to the second connector 2, and FIG. 6(*c*) shows a state in which from the rear surface of the second connector "B", the conductive bolts 7*a* and 7*b* and the fixing bolt 7*c* are protruded to a side of the first connector "A"1 from a rear surface of the second connector "B".

FIG. 7 is a conceptual view schematically explaining one example of an electrically connected state by the conductive bolts to the "A" connector and the "B" connector of the cable unit according to the present invention and the sockets that are the output terminals of the junction box of the solar module and provided at the junction box. The "A" connector and the "B" connector are generally illustrated for simplification but have the complimentary combination shapes shown in FIGS. 1(*a*) and 1(*b*), and electrical connection without rattling and reliable fixation to the junction box are made.

As shown in FIG. 7, in the "A" connector 1 of the cable unit extending from upstream (left side in FIG. 7), the plugs 12 (the negative plug 12*a*, the positive plug 12*b*) are inserted into the sockets 14 (the negative socket 14*a*, the positive socket 14*b*) of the junction box 5 so that they are screwed along them. The plugs 120 (the negative plug 120*a*, the positive plug 120*b*) on one side surface of the "B" connector 2 extending downstream (right side in FIG. 7) are inserted into the sockets 8 (the negative socket 8*a*, the positive socket 8*b*) on a side surface opposite to the junction box 5, of the "A" connector 1. The respective plugs and the respective sockets are aligned on straight lines. The superposed two connectors are integrated with the screw 7*c*.

In this state, the conductive bolts 7 (the negative conductive bolt 7*a*, the positive conductive bolt 7*b*) are screwed into nuts of the socket 14 (the negative socket 14*a*, the positive socket 14*b*) of the junction box 5 from the sockets 80 (the negative socket 80*a*, the positive socket 80*b*) of the "B" connector 2 and fixed. Note that reference signs 15a and 15b denote terminals connecting to the output of the PV panel. Fixing work by the conductive bolts 7 (the negative conductive bolt 7a, the positive conductive bolt 7b) and the fixing bolt 7c may be opposite to the above described procedure.

Next, one example of panel bypass work when a malfunction occurs to a PV panel equipped with the junction box 5 will be described. First, the conductive bolts 7 (the negative conductive bolt 7a, the positive conductive bolt 7b) are loosened to release engagement with the output terminal 15 (the negative output terminals 15a and 15b) of the PV panel. Electrical connection of the first connector 1 and the second connector 2 is maintained.

As necessary, appropriate nuts (not illustrated) may be fitted and fixed to free ends of the conductive bolts 7 (the negative conductive bolt 7a, the positive conductive bolt 7b). It is more preferable to cover the free ends of the conductive bolts 7 (the negative conductive bolt 7a, the positive conductive bolt 7b) with appropriate insulation caps.

The fixing bolt 7c can be long enough to reach a casing of the second connector 2 from a rear surface of a casing of the first connector 1 to fix both of them.

Figure 8:
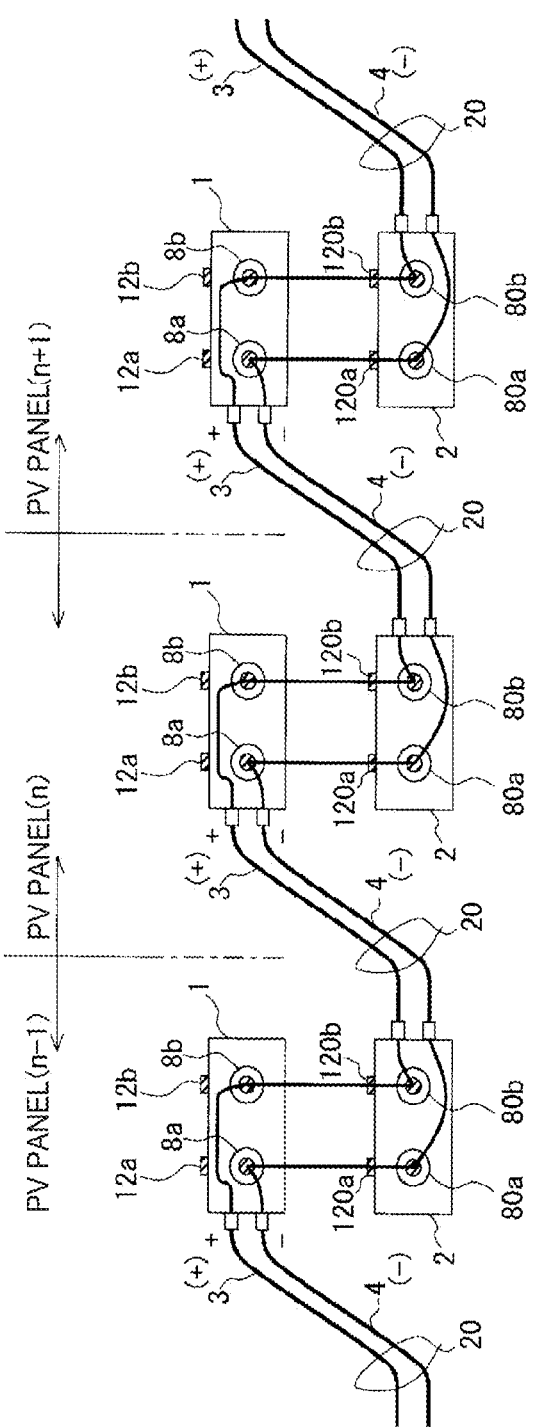
FIG. 8 is an explanatory view of a connection state of a PV panel (n–1) and a PV panel (n+1) adjacent to a PV panel (n).

FIG. 8 is an explanatory view of a connection state of a PV panel (n−1) on an upstream side and a PV panel (n+1) on a downstream side that are adjacent to a PV panel (n), and schematically shows a state of parallel connection between the junction boxes 5 of the plurality of PV modules using the cable unit. FIG. 8 schematically shows the connection state of the PV panel (n−1) and the PV panel (n+1) that are adjacent to the PV panel (n).

Use of the standardized cable unit facilitates conveyance of the PV panels and accessory members thereof and handling during construction, improves working efficiency, and contributes to reduction of entire cost.

In the mega solar in which the modules composed of thousands to tens of thousands of PV panels are arranged, it is extremely useful to easily and safely perform the work required to disconnect the PV panel where a malfunction occurs, and reconnect the recovered PV panel. According to the present example, it is possible to realize such highly efficient work. The same applies to the case where each module is bypassed.

REFERENCE SIGNS LIST

1 first connector ("A" connector)
1a, 2a negative cable fixing portion
1b, 2b positive cable fixing portion
1c, 2c cable fixing hole
2 second connector ("B" connector)
3 positive cable
4 negative cable
5 junction box (containing optimizer circuit)
6 PV panel
7a, 7b conductive coupling bolt or screw
7c bolt or screw for coupling and fixing
8, 80 socket
8a, 80a socket for negative electrode
8b, 80b socket for positive electrode
8c, 80c coupling bolt hole or screw hole
10 cable unit
12, 120 plug
14 socket
15 output terminal portion of PV panel (15a negative output terminal, 15b positive output terminal)

18 terminal plate
20 pair cable
21 parallel connection cable
22 power conditioner (power conditioner)
23 series connection cable
50 junction box (without optimizer circuit)
60 solar module

The invention claimed is:

1. A cable unit for interconnecting power generation outputs of a plurality of PV panels each including a junction box containing an optimizer, in parallel, the cable unit comprising a plurality of pairs of cables, wherein each of the pair of cables comprises a positive cable and a negative cable, and the each of the pair of cables comprises a first connector formed of an insulation material and attached to a first end of the pair of cables and a second connector formed of an insulation material and attached to a second end of the pair of cables, wherein the first connector has:
a first conductive socket for a first negative electrode including a first terminal plate, and
a second conductive socket for a first positive electrode including a second terminal plate, and the second connector has:
a third conductive socket for a second positive electrode including a third terminal plate, and
a fourth conductive socket for a second negative electrode including a fourth terminal plate, wherein the first connector and the second connector are for conductively connecting to power generation output terminals of the junction box, and a conductive plug for the first negative electrode and a conductive plug for the first positive electrode are provided on a surface of the first connector, wherein the conductive plug for the first negative electrode and the conductive plug for the first positive electrode are connected to a second connector associated with a second pair of cables of the plurality of pairs of cables;

conductive coupling bolts that conductively connect a negative connection terminal and a positive connection terminal of the junction box included by a PV panel of the plurality of PV panels, the second conductive socket for the first positive electrode and the first conductive socket for the first negative electrode of the first connector of the first cable, the conductive plug for the first positive electrode and the conductive plug for the first negative electrode of the first connector of the first cable, a socket for the second positive electrode and a socket for the second negative electrode of the second connector of the second pair of cables are aligned according to a negative polarity and a positive polarity.

2. The cable unit according to claim 1, further comprising a space recessed inward in an extending direction of the each of the pair of cables between the conductive plug for the first negative electrode and the conductive plug for the first positive electrode of the first connector.

3. The cable unit according to claim 2, wherein a cable fixing hole in the first connector is recessed in the extending direction, wherein the cable fixing hole is between the plug for the first negative electrode and the second connector associated with the second pair of cables, and the cable fixing hole has an inclination outward at an angle θ with respect to the extending direction.

4. The cable unit according to claim 1, wherein the first conductive socket of the first connector and the third conductive socket the second connector have complimentary concave and convex shapes for preventing erroneous connections.

5. The cable unit according to claim 1, further comprising coupling bolt holes for passing the conductive coupling bolts that respectively penetrate through the second connector associated with the second pair of cables and the first connector, wherein the conductive coupling bolts connect the first connector and the second pair of cables to output terminals of the junction box.

\* \* \* \* \*